United States Patent
Inderrieden et al.

(10) Patent No.: US 10,169,960 B2
(45) Date of Patent: Jan. 1, 2019

(54) INTERACTION METHOD BETWEEN AN ATTENDANT COMPUTER AND A SELF-SERVICE COMPUTER

(75) Inventors: Michael T. Inderrieden, Lawrenceville, GA (US); Jennie P. Johnson, Suwanee, GA (US); Paul F. Knight, Loveland, CO (US); Larry J. Salmen, Fort Collins, CO (US); Kip O. Morgan, Fort Collins, CO (US); Steven W. Ulrich, Fort Collins, CO (US)

(73) Assignee: NCR Corporation, Atlanta, GA (US)

(*) Notice: Subject to any disclaimer, the term of this patent is extended or adjusted under 35 U.S.C. 154(b) by 1596 days.

(21) Appl. No.: 12/425,752

(22) Filed: Apr. 17, 2009

(65) Prior Publication Data

US 2010/0201779 A1    Aug. 12, 2010

Related U.S. Application Data

(60) Provisional application No. 61/150,558, filed on Feb. 6, 2009.

(51) Int. Cl.
| | | |
|---|---|---|
| G06Q 20/20 | (2012.01) | |
| G07F 19/00 | (2006.01) | |
| G06Q 20/10 | (2012.01) | |
| G06Q 30/02 | (2012.01) | |
| G06Q 50/10 | (2012.01) | |
| G06F 15/16 | (2006.01) | |
| H04L 12/24 | (2006.01) | |

(52) U.S. Cl.
CPC ............ *G07F 19/20* (2013.01); *G06Q 20/10* (2013.01); *G06Q 20/202* (2013.01); *G06Q 30/02* (2013.01); *G06Q 50/10* (2013.01); *G07F 19/201* (2013.01); *G07F 19/211* (2013.01); *H04L 41/5061* (2013.01)

(58) Field of Classification Search
CPC ............... G06Q 20/20; G06Q 30/0621; G06Q 30/0641; G06Q 30/0601; G06Q 50/12; G06Q 20/202; G07G 1/14; G07G 1/0036; G07G 1/00; A47F 10/02; A47F 10/00; G06F 3/1454; G08B 7/068; H04W 4/00
See application file for complete search history.

(56) References Cited

U.S. PATENT DOCUMENTS

| | | | | | |
|---|---|---|---|---|---|
| 5,235,509 | A * | 8/1993 | Mueller | ............... | G06Q 10/087 345/173 |
| 6,087,927 | A * | 7/2000 | Battistini | ................ | A47F 10/02 340/286.06 |
| 6,295,551 | B1 * | 9/2001 | Roberts | ............... | G06F 9/44526 709/203 |
| 6,431,444 | B1 * | 8/2002 | Gatto | ...................... | A47F 9/048 235/375 |
| 6,497,362 | B2 * | 12/2002 | Persky | ................... | G06Q 30/02 235/379 |
| 6,754,693 | B1 * | 6/2004 | Roberts | ............... | G06F 9/44526 379/265.09 |

(Continued)

*Primary Examiner* — Florian M Zeender
*Assistant Examiner* — Dana Amsdell
(74) *Attorney, Agent, or Firm* — Schwegman, Lundberg & Woessner

(57) ABSTRACT

An interaction method between an attendant computer and one or more self-service computers where all computers share common application data, which facilitates real-time display of selections made by either a customer or an attendant at their respective computers.

18 Claims, 7 Drawing Sheets

(56) References Cited

U.S. PATENT DOCUMENTS

| | | | |
|---|---|---|---|
| 7,209,891 B1 | 4/2007 | Addy et al. | |
| 7,490,761 B2 * | 2/2009 | Taylor et al. | 235/379 |
| 7,558,739 B2 * | 7/2009 | Thomson | G06Q 10/06311 |
| | | | 455/414.1 |
| 7,996,461 B1 * | 8/2011 | Kobres | G06F 9/542 |
| | | | 186/59 |
| 2002/0148896 A1 * | 10/2002 | Persky | G06Q 30/02 |
| | | | 235/383 |
| 2003/0024982 A1 * | 2/2003 | Bellis, Jr. | A47F 9/047 |
| | | | 235/383 |
| 2005/0049921 A1 * | 3/2005 | Tengler et al. | 705/15 |
| 2006/0190344 A1 * | 8/2006 | Sang et al. | 705/26 |
| 2007/0265935 A1 * | 11/2007 | Woycik | G06Q 20/367 |
| | | | 705/65 |
| 2009/0027408 A1 * | 1/2009 | Hwang | H04L 12/1827 |
| | | | 345/531 |
| 2009/0265247 A1 * | 10/2009 | Carroll et al. | 705/15 |
| 2009/0292999 A1 * | 11/2009 | LaBine | H04L 12/1827 |
| | | | 715/740 |
| 2011/0205435 A1 * | 8/2011 | Lee | H04N 5/44543 |
| | | | 348/563 |

\* cited by examiner

INTERACTION METHOD BETWEEN AN ATTENDANT COMPUTER AND A SELF-SERVICE COMPUTER

CROSS-REFERENCE TO RELATED APPLICATIONS

The present application claims the benefit of the filing date of Provisional Application Ser. No. 61/150,558, filed Feb. 6, 2009, under the same title.

BACKGROUND

Self-service computer systems have replaced assisted-service computer systems in many business environments today. For example, self-service computer systems may be found in banking, retail, hospitality, travel, entertainment, medical, and other environments.

Self-service computer systems allow customers to complete transactions without assistance; however, there may be instances where customers require some level of assistance.

For example, in some travel and quick service venues, a wandering greeter may assist customers with completing a transaction or answer customer questions about completing the transaction. However, the added labor expense of a wandering greeter reduces the possibility of obtaining an adequate return on investment. In addition, the greeter is typically positioned amongst self-service computers and therefore cannot assist with other transaction related activities that can only be performed by being elsewhere.

Therefore, it would be desirable to provide an interaction method between one or more attendant computers and one or more self-service computers.

SUMMARY

An interaction method between an attendant computer and a self-service computer is provided.

An example interaction method includes determining a screen displayed by a self-service computer by an attendant computer; displaying the screen by the attendant computer substantially simultaneously with display of the screen by the self-service computer; recording attendant selections on the screen by an input device of the attendant computer, the attendant selections including selections made by the attendant on behalf of a user of the self-service computer; and sending the selections to the self-service computer by the attendant computer for substantially simultaneous display by the self-service computer.

DETAILED DESCRIPTION

Figure 1:
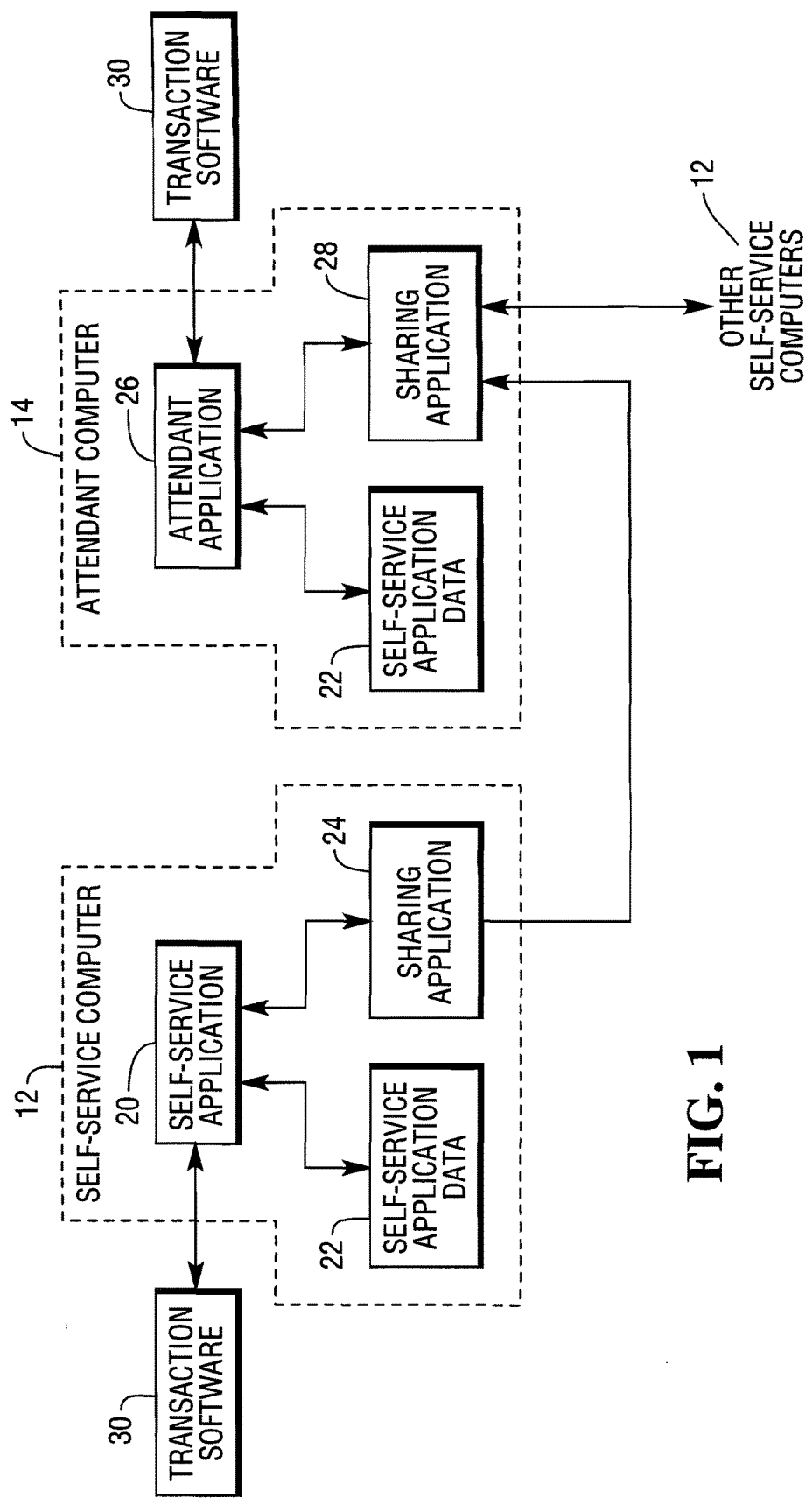
FIG. 1 illustrates a block diagram of an example embodiment of a transaction system.

Referring now to FIG. 1, a first example embodiment of system 10 includes one or more self-service computers 12 and attendant computer 14.

Self-service computer 12 and attendant computer 14 may be coupled together by a network. The network may be a proprietary network or a global communication network, such as the Internet.

Self-service computer 12 and attendant computer 14 may be located in close proximity to another so that an attendant may see and verbally interact with a customer. For example self-service computer 12 may include a self-service checkout computer in a retail store, a travel kiosk at an airport, or a quick service or pre-order pre-pay kiosk in a restaurant.

Alternatively, self-service computer 12 and attendant computer 14 may be located separately from each other. For example, self-service computer 12 may include a home computer, an automated teller machine, a quick service or pre-order pre-pay kiosk in a drive-through lane, a quick service or pre-order pre-pay kiosk in a play area, or a remotely located stand-alone kiosk.

Attendant computer 14 may include an attendant computer at a retail store, airport, hotel, rental car facility, restaurant, call center, or other local or remote venue.

Self-service computer 12 includes a processor, memory, program and data storage, a display, and one or more user input devices. The display and user input device may be combined as a touch screen. Self-service computer 12 additionally includes components and peripherals necessary to accomplish its purpose for the environment it is in. For example, self-service computer 12 may additionally include, but not be limited to, any of the following: one or more payment peripherals, a printer, an article identification unit such as a barcode reader or a radio frequency identification (RFID) tag reader, a biometric reader, a signature capture unit, a passport reader, and an electronic article surveillance (EAS) tag sense and deactivation unit.

For example, the display may display a graphic user interface and software for completing a transaction. The input device or touch screen may capture self-service user selections. The printer may print a receipt, coupons, and other promotions. The article identification unit may capture identification information in the form of a barcode or RFID tag identifier from products, user provided coupons to be included in the transaction, and other items. The biometric reader may capture information from users themselves, such as fingerprints. The signature capture unit may capture a user signature to be stored with a record of a transaction. The passport reader may capture information from user passports through optical character recognition and/or from electronic chips in the passports. The EAS tag sense and deactivation unit may identify security tags on products and deactivate them following purchase.

Self-service computer 12 may execute an operating system such as a Microsoft operating system, which can display screen information within one or more windows.

Self-service computer 12 allows a self-service customer to perform a transaction with or without assistance from an attendant at attendant computer 14. Self-service computer 12 executes self-service application 20 for this purpose. Self-service application 20 displays screens from self-service application data 22. The screens including currently displayed image data and selections available to a customer. Self-service application data 22 may be stored locally or remotely on a server.

Self-service application 20 may include screens and other display data and user input data. For example, display data may include data defining a currently displayed screen, including selections available to a customer, and selections recorded by the customer.

Self-service computer 12 additionally executes sharing application 24, which sends information to attendant computer 14, including the identity of a currently displayed screen and any selections made by a customer on that screen. Sharing application 24 further receives selections made by an attendant at attendant computer 14.

Self-service application 20 stores the selections as updates to self-service application data 22. Thus, sharing application 24 ensures that locally stored self-service application data 22 on self-service computer 12 is synchronized with self-service application data 22 stored by attendant computer 14. A customer at self-service computer 12 sees the same display information that is displayed by attendant computer 14. The customer can make selections and the attendant can watch the customer selections in real time as they are performed at attendant computer 14.

Self-service application 20 may optionally couple to other transaction software 30, either resident on self-service computer 12 or on one or more other computers connected to self-service computer 12 via a network. For example, transaction software 30 may be software provided by one vendor and self-service application 20 may be software provided by another vendor. For example, transaction software 30 may provide payment processing functions and self-service application 20 and attendant application 26 may hand-off payment processing to transaction software 30

Self-service computer 12 may include an interface software layer between self-service application 20 and transaction software 30. For example, self-service computer 12 may send order information through the software layer to transaction software 30.

In other environments, such as single vendor environments, the functions of transaction software 30 may be fully included within self-service application 20 and attendant application 26

In yet other environments, self-service computer 12 and attendant computer 14 may operate as a stand-alone system, independent of any existing point of sale system.

Attendant computer 14 includes a processor, memory, program and data storage, a display, and one or more user input devices. The display and user input device may be combined as a touch screen. Attendant computer 14 may additionally include components and peripherals necessary to accomplish its purpose for the environment it is in. For example, attendant computer 14 may include a receipt printer, payment peripherals, and alert peripherals.

Attendant computer 14 is coupled to one or an unlimited number of self-service computers 12. Attendant computer 14 allows an attendant to interact with a customer at any of self-service computers 12 during a transaction. Attendant computer 14 executes attendant application 26, which access local or remote copies of self-service application data 22 associated with each of the self-service computers 12 to obtain data defining a screen currently displayed by one or more self-service computers 12, including selections available to a customer, and selections already recorded by the customer.

Attendant computer 14 further executes sharing application 28, which receives the identity of the screen currently displayed by self-service application 20, and any selections made by a customer on that screen.

Attendant application 26 stores the screen identity information and the selections in the locally stored copy of self-service application data 22. Thus, sharing application 28 ensures that locally stored self-service application data 22 on attendant station 14 is synchronized with self-service application data 22 stored on self-service computer 12. An attendant at attendant computer 14 sees the same display information that is displayed by self-service computer 12. The attendant can make selections on behalf of the customer and the customer can watch the attendant selections as they are performed at self-service computer 12.

Attendant computer 14 may have different access rights to information in self-service application data 22. Self-service computer 12 may have limited access rights to some information. For example, only attendant computer 14 may access information necessary for ordering staff meals, processing wastage, and for processing coupons or discounts.

Attendant computer 14 may present information from self-service application data 22 in the same way as self-service computer 12 or in a different way. For example, self-service computer 12 may present a rich content view with audio, animations, variable screen transitions, and other modern graphic user interface features to enhance customer experience. On the other hand, attendant computer 14 may present a more simple view of the screen information displayed on self-service computer 12, without the multimedia and graphic user interface enhancements, particularly if computer processor or graphic engine speed and memory resources are limited on attendant computer 14.

In environments in which separate transaction software 30 exists, attendant computer 14 may include an interface software layer between attendant application 26 and transaction software 30.

Attendant application 26 may execute an operating system such as a Microsoft operating system, which can display screen information within one or more windows.

Self-service application 20 may initiate a request for help from an attendant. Attendant application 26 recognizes the request and activates an audible and/or visible alarm or message intended for the attendant. The attendant may provide any measure of help requested by the customer. One of the advantages of system 10 is providing customer training to help customers complete transactions with minimal assistance. However, in some circumstances, the attendant may offer to complete the remainder of a transaction on behalf of the customer. For example, the attendant may offer to complete the remainder of a transaction when there are long customer queues or when higher customer throughput is desirable.

If self-service computer 12 and attendant computer 14 are located in proximity with each other, the customer and attendant may communicate face-to-face. Otherwise, a customer may communicate with an attendant via other communication methods, such as live chat, instant messaging, verbal collaboration, network or close circuit or other type of audio and/or video feed, or over a telephone connection. Self-service application 20 and attendant application 26 may include capabilities to communicate using these methods.

For example, if self-service computer 12 is a located at a drive-through lane, self-service computer 12 and attendant computer 14 may include a network or other type of audio feed. Screen area may additionally be allocated to displaying images of the customer and/or the attendant via a network or other type of video feed and cameras in self-service computer 12 and attendant computer 14.

Attendant computer 14 may be one of a plurality of attendant computers 14 which has responsibility for a number of self-service computers 12. Each attendant computer 14 may be configured to yield control to another attendant computer 14. Thus, the system configuration may be tailored to transaction volume. During high transaction volumes, each attendant station 14 may be manned. During low transaction volumes, fewer than all attendant stations 14 may be manned. If one of attendant computers 14 is not working properly, another attendant computer 14 may take control of self-service computers 12 managed by the non-functioning attendant computer 14.

Attendant computer 14 may actively monitor the health and status of self-service computer 12. Attendant computer 14 may display alerts to the attendant if error conditions occur at self-service computer 12. Attendant computer 14 may keep an error log.

Figure 2:
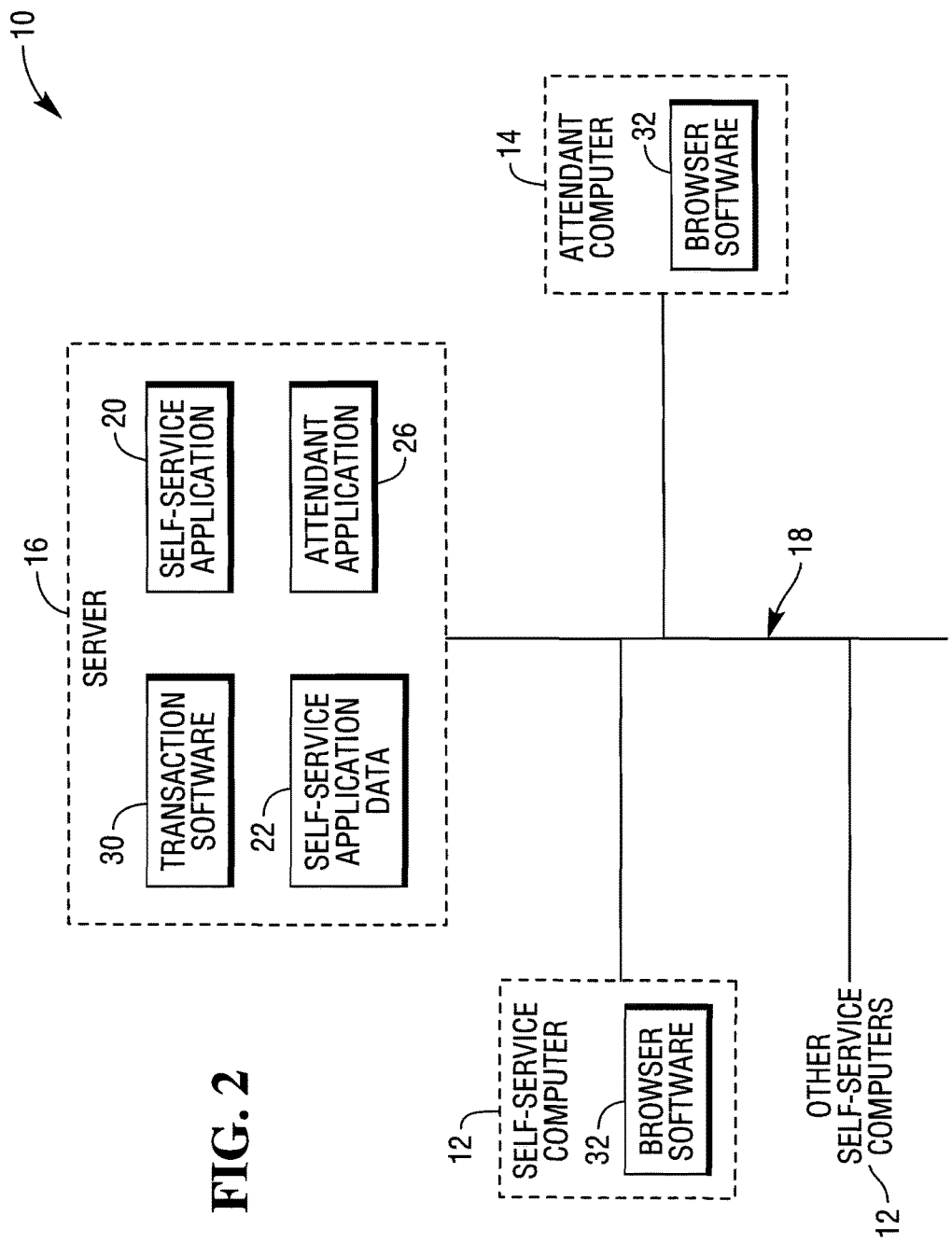
FIG. 2 illustrates a block diagram of another example embodiment of a transaction system.

With reference to FIG. 2, another example embodiment of system 10 is illustrated.

Either or both of self-service computer 12 and attendant computer 14 may be configured as thin client computers. As such, either or both of self-service computers 12 and attendant computer 14 may be diskless workstations that focus on conveying input and output between users and server 16 over network 18. Server 16 may perform most of the processing activities.

Server 16 represents one or more servers for storing self-service application data 22, including changes received from self-service computer 12 and attendant computer 14. Server 16 further stores self-service application 20, attendant application 26, and transaction software 30.

Self-service application 20, attendant application 26, and transaction software 30 may be written as web applications which display screen data in the form of web pages written using hypertext markup language (HTML), JavaScript, Java, or other suitable web page development language.

Self-service computer 12 and attendant computer 14 store and execute a limited amount of software, which may include browser software 32. Browser software 32 facilitates execution of self-service application 20, attendant application 26, and transaction software 30.

Figure 3:
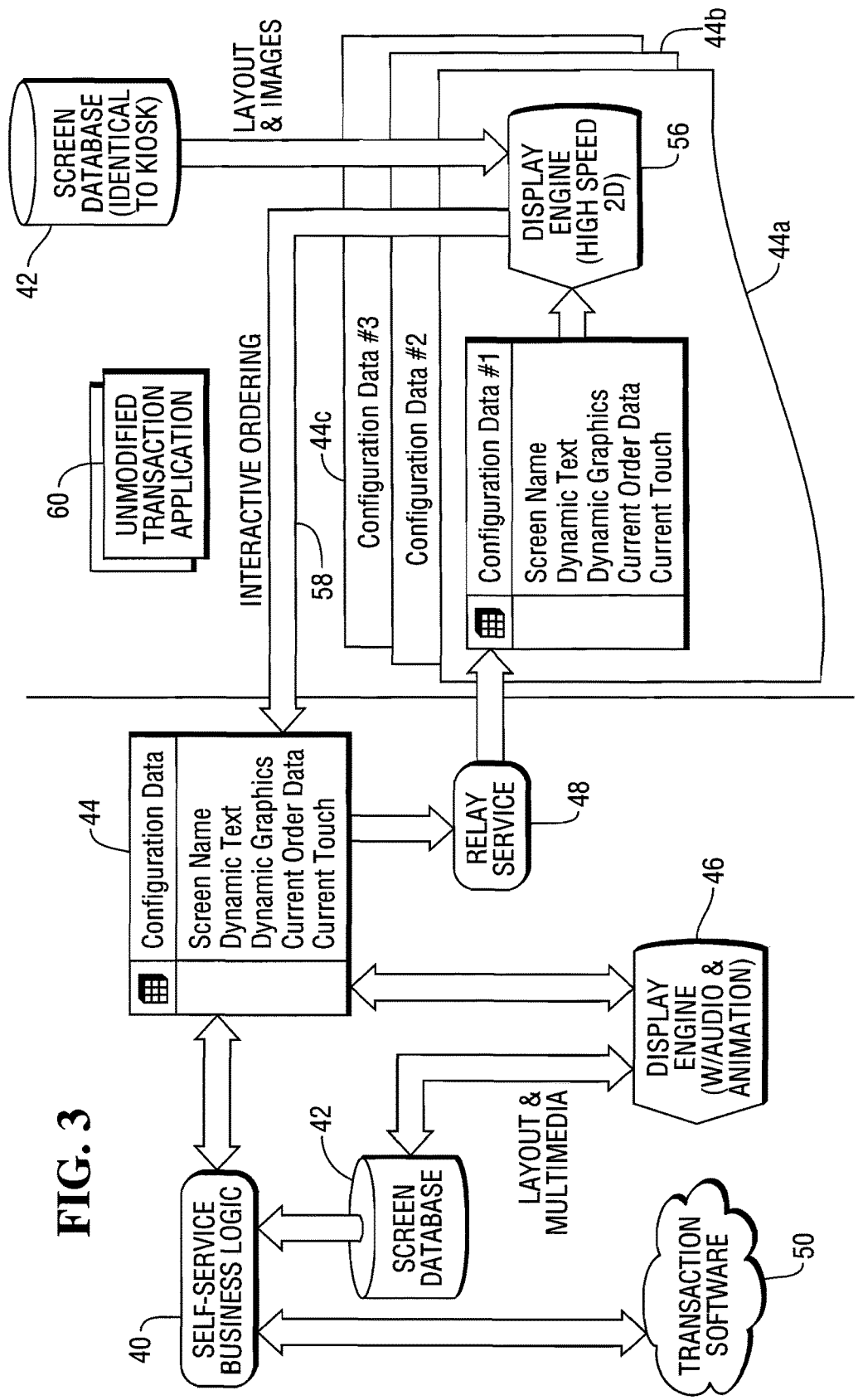
FIG. 3 illustrates an architectural diagram illustrating software components involved in establishing interaction between a self-service computer and an attendant computer.

Turning now to FIG. 3, an example embodiment of the architecture of system 10 is illustrated.

Self-service computer 12 includes self-service business logic 40, screen database 42, configuration data 44, display engine 46, and relay service 48.

Self-service business logic 40 controls transaction related functions of self-service computer 12, including control over which screens from screen database 42 are displayed. Self-service business logic 40 may rely on additional transaction software 50, either local or remote, to complete some transaction related functions related to the purpose of self-service computer 12, such as completing payment and maintaining loyalty information.

Self-service business logic 40 maintains a record of currently displayed screens by screen name or other identifier in configuration data 44. Configuration data 44 may include registry data in self-service computers 12 and attendant computers 14 configured with a Microsoft operating system.

Self-service business logic 40 maintains a record of other transaction related information in configuration data 44, such as current customer input data, current order data, and any dynamic graphics or text data that is used in displaying screens.

Display engine 46 obtains current screen information dictated by self-service business logic 40 from configuration data 44. Display engine 46 obtains screen data from screen database 42. Screen data may include screen objects, screen layout information, instructions for displaying screens, any graphics or multimedia files or links to graphics or multimedia files associated with the screens, and links to other data associated with the screens.

Display engine 46 obtains current input data from configuration data 44, including current selections made by either a customer or by an attendant. Display engine 46 dynamically generates displayed screens from both screen data and input data.

Relay service 48 monitors for and identifies changes in configuration data 44 and sends them over the network connection between self-service computer 12 and attendant computer 14.

Attendant computer 14 includes screen database 42, configuration data 44, display engine 56, and interactive ordering logic 58.

Screen database 42 contains substantially identical screen data as found in the screen database 42 of self-service computer 12. Both screen databases 42 may be synchronized or combined into a single screen database 42 shared by both self-service computer 12 and attendant computer 14. The single screen database 42 may be stored on a server.

Configuration data 44 includes substantially identical configuration data found in configuration data 44 of self-service computer 12. Both sets of configuration data 44 are synchronized by relay service 48. If there is more than one self-service computer 12, attendant computer 14 stores configuration data 44 for each self-service computer 12. In the illustrated example, attendant computer 14 stores three sets of configuration data 44a-c for three self-service computers 12; however, attendant computer 14 may connect with any number of self-service computers 12 and store associated configuration data 44.

As changes occur in configuration data 44 at self-service computer 12, relay service 48 updates corresponding configuration data 44 on attendant computer 14.

Changes in configuration data 44 at self-service computer 12 may include changes made at attendant computer 14 and transferred to self-service computer 12 by interactive ordering logic 58. Changes at attendant computer 14 may include attendant selections.

Interactive ordering logic 58 monitors for and identifies changes in configuration data 44 at attendant computer 14 and sends them over the network connection between self-service computer 12 and attendant computer 14 to be stored in configuration data 44 at self-service computer 12. Thus, selections made by an attendant are substantially immediately visible to a customer at self-service computer 12.

While the attendant is making selections, the customer can see the screen flow dialogue at self-service computer 12. Advantageously, the attendant can provide training and encourage customers to use self-service computer 12, resulting in an increase in utilization of self-service computer 12 and fewer customers walking away.

Attendant computer 14 may rely on additional transaction software 60, either local or remote, to complete some transaction related functions related to the purpose of self-service computer 12, such as completing payment. In example venues in which self-service computer 12 and attendant computer 14 are located in close proximity to one another, attendant computer 14 may take cash payment from customers. Thus, self-service computer 12 would not require expensive cash payment components, such as coin/bill acceptors/dispensers.

Figure 4:
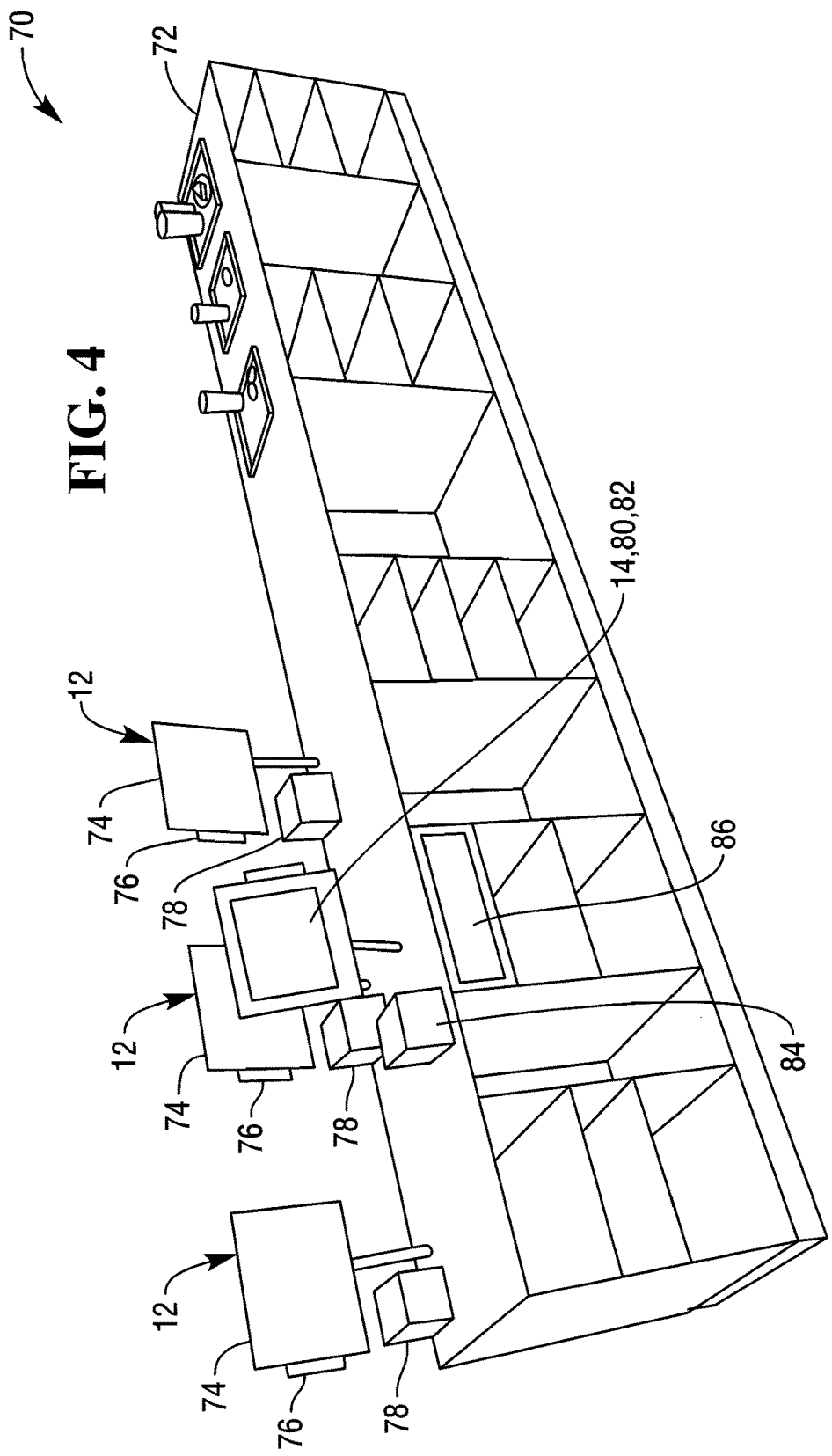
FIG. 4 illustrates an example self-service system.

Turning now to FIG. 4, an example self-service system 70 is illustrated. The example self-service system is located in a quick service venue.

Self-service system 70 includes service counter 72, one or more self-service computers 12, and one or more attendant computers 14. This illustration includes three self-service computers 12 facing a customer side of counter 72 and one attendant computer 14 in close proximity to the self-service computers 12 and facing an attendant side of counter 72. However, attendant computer 14 may manage additional self-service computers 12, including one or more self-service computers 12 in drive-through lanes. Attendant computer 14 may also be coupled to transaction software 30, including POS software, for handling some payment functions.

Example self-service computers 12 each include a computer 74, card reader 76, and printer 78. Computer 74 includes a touch screen. Computer 74 may be equipped with multimedia capability, including multimedia graphics display hardware and audio playing hardware. Card reader 76 facilitates payment by card. Printer 78 is a receipt printer.

Example self-service computers 12 may include additional peripherals. For example, self-service computers 12 may include barcode readers for reading barcodes on customer-provided coupons.

Example attendant computer 14 includes computer 80, card reader 82, printer 84, and cash drawer 86. Computer 80 includes a touch screen, but may include separate display and input devices, such as a keyboard. Card reader 82 facilitates assisted payment by card. Printer 84 is a receipt printer for assisted payment transactions. Cash drawer 86 stores cash for cash transactions and personal and traveler checks for check transactions. Since the attendant stands in close proximity to the customers, the attendant can process all cash transactions.

In this example, self-service computers 12 require no cash payment peripherals. However, self-service computers 12 in other environments, particularly environments in which self-service computers 12 are remotely located from attendant computer 14, self-service computers 12 may require cash payment peripherals including one or more of currency and coin dispensers and acceptors.

For example, a self-service computer 12 in a quick service drive-through, a quick service play place, a shopping mall food court, or other remote pre-order pre-pay venue may require cash payment peripherals.

Example attendant computer 14 may include additional peripherals. For example, attendant computer 14 may include a barcode reader for reading barcodes on customer-provided coupons.

The attendant can also perform many traditional food delivery and store operation functions while performing attendant functions. For example, in monitoring beverage orders at self-service checkout computers 12, the attendant can identify and provide the number of cups required by each transaction from a cup container behind counter 72. Advantageously, using the attendant in this way provides major savings in labor costs.

Attendant computer 14 may include audio and/or visual alerts to capture the attendant's attention. Attendant computer 14 may include alerting peripherals including an add-on light or combination of different lights, a beeper, a buzzer, or a messaging system to wirelessly contact an attendant beeper or cell phone.

Figure 5:
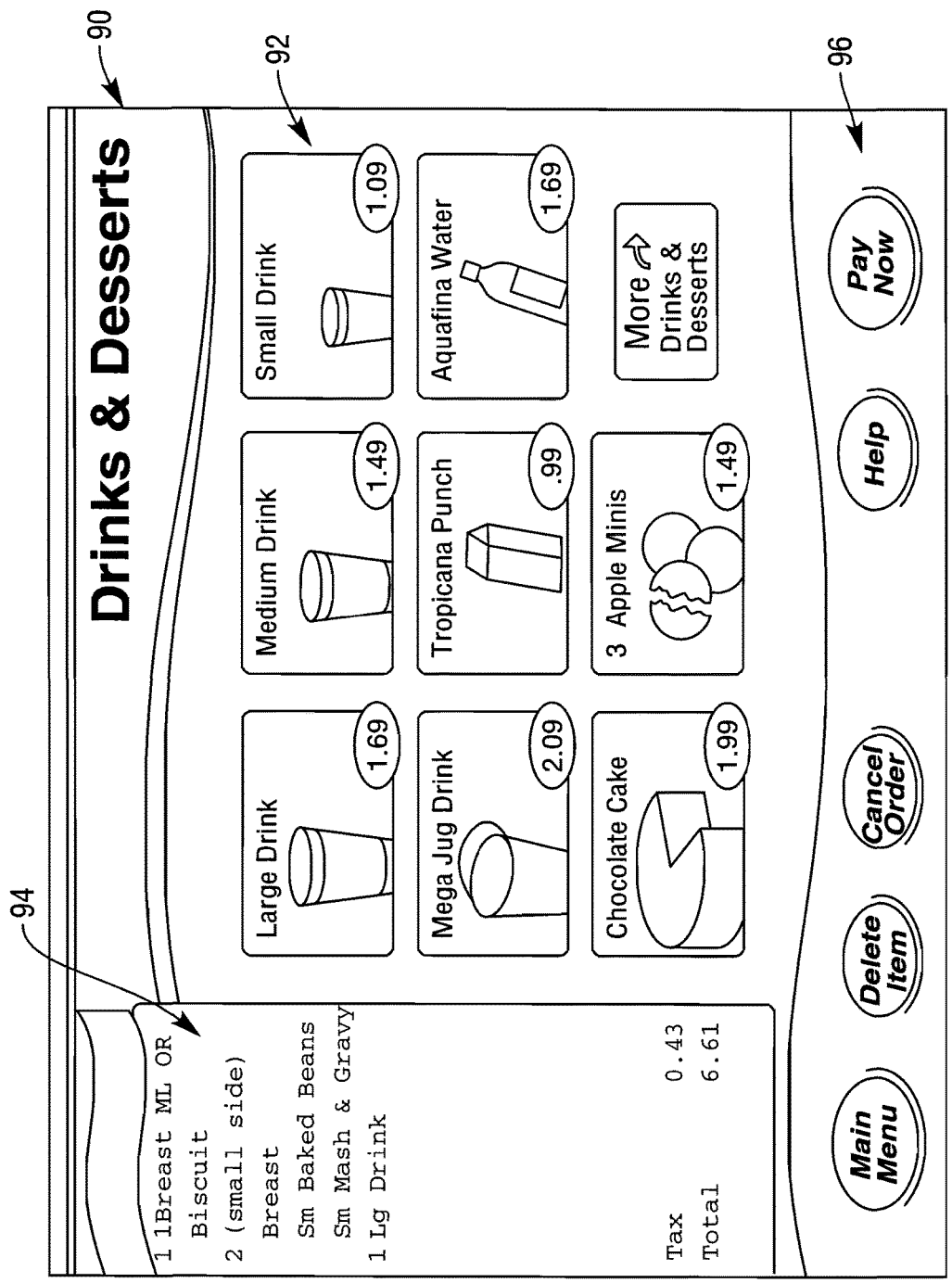
FIG. 5 illustrates an example screen of a self-service computer in the example self-service system.

Turning now to FIG. 5, an example screen 90 at self-service computer 12 is illustrated.

Example screen 90 includes a menu section 92 containing choices available to a customer, a receipt section 94 containing a running tally of customer selections, and a control section 96 containing navigation choices.

Example control section 96 includes buttons that allow a customer to return to a main menu, delete an item from receipt section 94, cancel the order, request help, or pay if finished ordering. Self-service application 20 may alert attendant application 26 if the customer elects to cancel the order or request help. Other control buttons may be present.

All customers are eligible to use self-service computers 12. Self-service computers 12 may permit completion of payment in any known form or combinations of forms, including but not limited to credit card, debit card, gift cards, coins, currency, personal checks, coupons, and traveler checks. Self-service computers 12 may process credit and debit card payments, but send cash or combination payments to the POS software. Self-service computers 12 may permit recharging of gift cards and queries for current gift charge balances.

Figure 6:
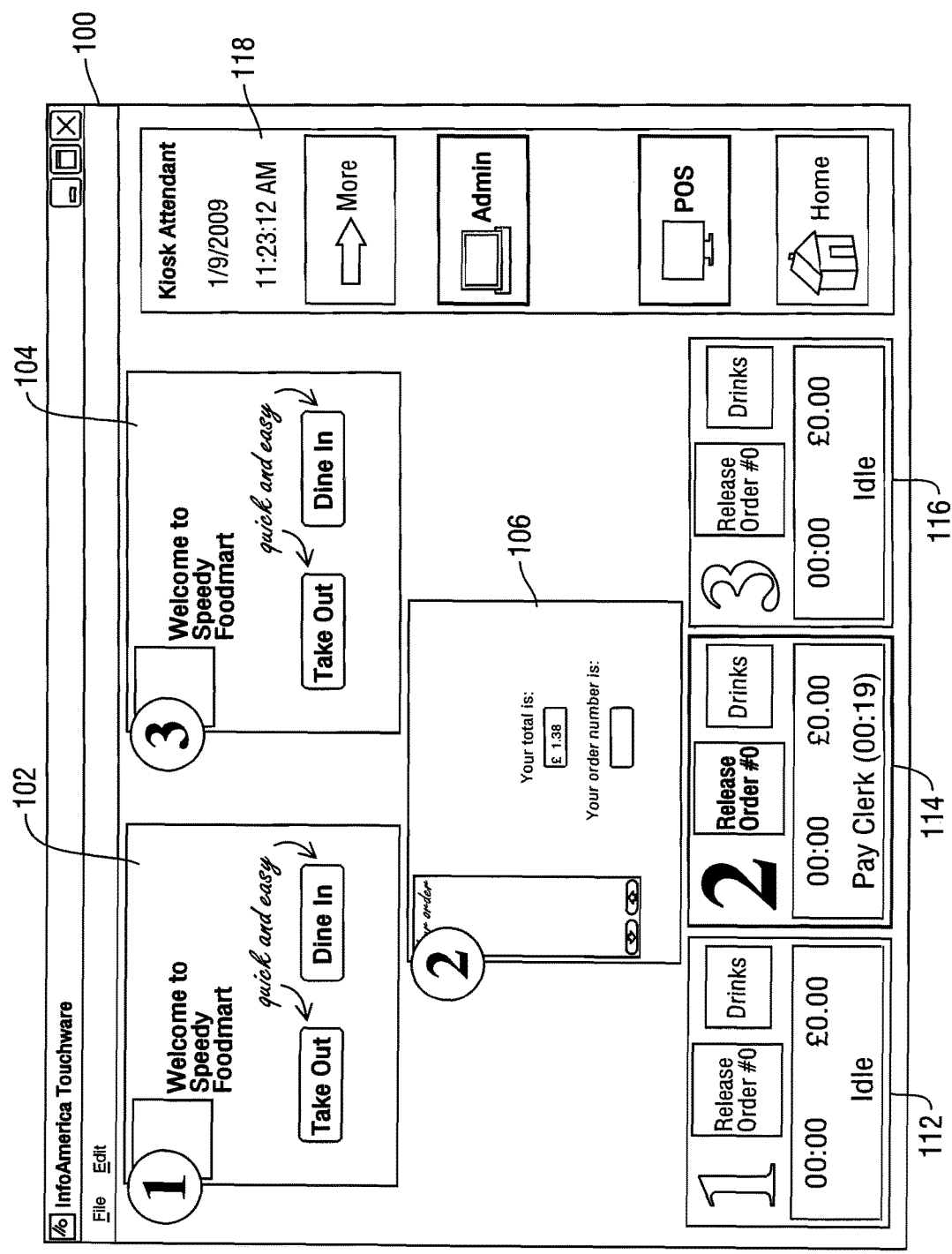
FIG. 6 illustrates an example screen of an attendant computer in the example self-service system.

Turning now to FIG. 6, an example screen 100 at attendant computer 14 is illustrated.

Example screen 100 includes three numbered display sections 102, 104, and 106 associated with information displayed by three self-service computers 12, and corresponding numbered control sections 112, 114, and 116. Attendant application 26 is capable of displaying fewer or more display sections. Example screen further includes an administrative section 118 containing administrative choices available to an attendant.

Attendant application 26 may be configured to display Screen 100 as a window as illustrated or full screen.

An attendant may assist a customer with ordering items by selecting the numbered display of the customer's self-service computer 12. In response to a touch in any of display sections 102, 104, or 106 or in a corresponding control section 112, 114, or 116, attendant application 26 causes a chosen display section to zoom to full screen view with full touch control, with the attendant able to make the same selections as the customer. Attendant application 26 may display selected control sections in full color and unselected control sections as grayed out.

Attendant application 26 rapidly displays any customer button touches and changes in displayed information from self-service application 20.

Attendant application 26 highlights a "drinks" button when drinks are ordered. The drinks button may indicate a number of drinks ordered.

Attendant application 26 displays alert information to an attendant. In an example embodiment, attendant application 26 may display different colors for different events in the ordering process. For example, the colors of the three numbered display sections 102, 104, and 106 and/or corresponding numbered control sections 112, 114, and 116 may be changed in response to the different events.

In the example embodiment, a first color may indicate that a corresponding self-service computer 12 requires no immediate attention from an attendant.

A second color may indicate to the attendant that a customer at self-service computer 12 might be having a problem, but help is not required. A typical problem that would result in this type of warning may include a timeout, possibly one indicating that the customer wishes to cancel an order. With such a warning, the attendant may ask the customer if the customer needs assistance.

A third color may indicate that the customer at self-service computer 12 is waiting for assistance from the attendant. For example, one situation is where the customer wants to pay with cash, and the attendant is needed to tender the order.

A fourth color may indicate that the self-service customer 12 is out of service or there is a network error.

A message area displays messages indicative of the status of self-service computer 12. The display messages supplement information gleaned by an attendant when in screen view mode. For example, one status message may communicate the amount of time the customer has been operating self-service computer 12 or whether the self-service computer 12 is idle. Another status message may indicate that the user has cancelled a transaction. Yet another status message may indicate that the customer has selected cash payment. Yet another status message may indicate the value of a transaction.

Attendant application 26 may be configured to flash warnings in the message areas. For example, the message areas may flash warnings when customers have been waiting longer than a predetermined time period, when an order item count is exceeded, or when an order value exceeds a preset amount.

Administrative section 118 includes attendant control buttons. A "Home" button displays the multiple self-service computer screens, for example, the three screens of FIG. 6.

A "POS" button displays a POS software screen 130 (FIG. 7), for example, bringing it to the forefront or displaying it separately from attendant application 26.

An "Admin" displays a screen indicating the status of each self-service computer 12 and allows the attendant to activate, deactivate or reboot the self-service computers 12.

Attendant computer 14 is capable of displaying all customer operation of self-service computer 14, including when a customer places an order for food items and when the order is complete and the customer chooses a payment method. If the customer pays with credit card only, then the customer may complete the order by swiping a credit card and receiving a receipt without asking for any further intervention by the attendant. If the customer pays with coupons, cash, or multiple payment types, the order may be sent to POS software, without a payment. Self-service computer 12 displays a screen instructing the customer to complete payment with assistance from the attendant.

Figure 7:
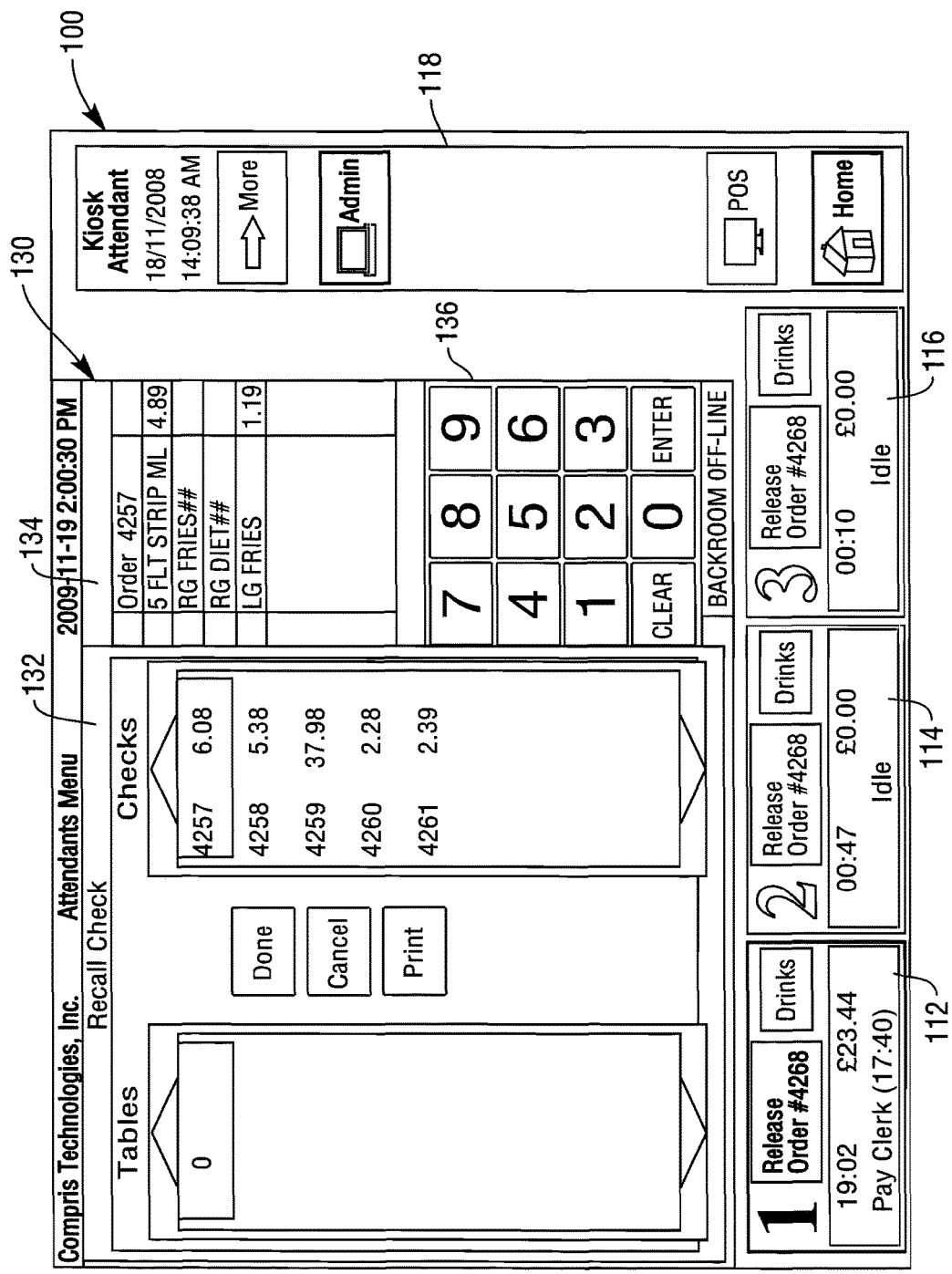
FIG. 7 illustrates another example screen of an attendant computer in the example self-service system.

At this point, the attendant causes attendant computer 14 to display a POS payment screen (FIG. 7). The attendant recalls the customer's order, takes customer payment, and completes tendering of the order. Finally, the attendant prints one or more receipts generated by the POS software, and gives one to the customer, along with any change.

Following completion of an order, an attendant selects the "release order" button to reset the corresponding self-service computer 12 for the next transaction. Self-service computer 12 displays a welcome screen in response to selection of the "release order" button by the attendant. As an alternative to the attendant physically selecting a 'release order' button, attendant computer 14 may automatically reset self-service computer 12, for example, in response to recalling the stored order, selecting cash as the tender method, or indicating the cash amount tendered.

Attendant applications 26 receives updated controls and corresponding screen position information whenever any of self-service computers 12 receive these updates. These updates may be in the form of common and customized dialogs and dialog position information.

With reference to FIG. 7, example POS software screen 130 appears in the forefront over example attendant screen 100. One example method of combining POS software screen 130 with attendant screen 100 in a Microsoft Windows environment is to identify a rectangular region where POS software screen 130 will reside, assign a certain color to the region, and designate the color as being a "transparency key". The Microsoft Windows API makes the pixels completely transparent, allowing POS software screen 130 to appear.

Example POS software screen 130 is an NCR Compris POS Recall Check screen.

POS software screen 130 includes an order list section 132, an order section 134, and a keypad section 136.

Order list section 132 displays a list of transactions.

Order section 134 lists items in a currently selected transaction in order list section 132.

Keypad section 136 includes a keypad.

Using example POS software screen 130, an attendant can verify an order and quickly proceed to an additional screen for tendering payment and printing a receipt.

Although particular reference has been made to certain embodiments, variations and modifications are also envisioned within the spirit and scope of the following claims.

What is claimed is:

1. A system comprising:
an attendant computer including a display for displaying a screen from a self-service computer displayed by the self-service computer during a transaction, wherein the screen from the self-service computer includes selections entered into the self-service computer by a user, wherein the attendant computer and the self-service computer display the screen substantially simultaneously during the transaction through interaction with a screen database that shares screen data from a screen database located on a server between the attendant computer and the self-service computer and wherein the screen data for the screen, and the screen data including: screen objects, screen layout information, instructions for displaying the screen, graphics and multimedia files or links to graphics, and other links to other data associated with the screen, the attendant computer further including an input device for recording attendant selections on the screen, the attendant selections including selections made by the attendant on behalf of the user of the self-service computer during the transaction, and for sending the selections to the self-service computer for substantially simultaneous display by the self-service computer, the attendant selection immediately visible to the user at the self-service computer when made by the attendant, and the screen presented on attendant computer and the self-service computer are synchronized with one another during the transaction, and wherein the attendant computer configured with access rights to access information stored in self-service computer during the transaction and the access rights of the attendant computer is different from self-service computer access rights to that information for the self-service computer during the transaction, and wherein the screen presented on the attendant computer includes a message area that displays messages indicative of a status of the self-service computer, the status including an amount of time that the user has been operating the self-service computer during the transaction.

2. The system of claim 1, wherein the attendant computer is located in close proximity to the self-service computer.

3. The system of claim 1, wherein the attendant computer is located remotely from the self-service computer.

4. The system of claim 3, further comprising a voice communication system for facilitating voice communication between the attendant and the user of the self-service computer.

5. The system of claim 3, further comprising a voice and video communication system for facilitating voice and video communication between the attendant and the user of the self-service computer.

6. The system of claim 5, wherein the attendant computer displays an image of the user.

7. The system of claim 1, wherein the attendant computer further comprises a cash handling peripheral.

8. The system of claim 7, wherein the attendant computer processes all cash transactions at the self-service computer.

9. The system of claim 1, wherein the attendant computer couples to a transaction server for completing payment.

10. The system of claim 1, wherein the attendant computer stores a copy of screen data displayed by the self-service computer.

11. The system of claim 10, wherein the attendant computer identifies a displayed screen and selections made by the user on the self-service computer and displays a similar screen and the selections made by the user.

12. The system of claim 11, wherein the attendant computer sends selections made by the attendant to the self-service computer for display.

13. The system of claim 1, further comprising another attendant computer capable of taking control of the self-service computer and other self-service computers.

14. An interaction method comprising:
    determining by an attendant computer a screen displayed by a self-service computer during a transaction, wherein the screen of the self-service computer includes selections entered into the self-service computer by a user;
    displaying the screen from the self-service computer by the attendant computer substantially simultaneously with display of the screen by the self-service computer during the transaction through interaction with a screen database that shares the screen identical to the screen displayed on the self-service computer by obtaining screen data for the screen from the screen database for: screen objects associated with the screen, screen layout information, instructions for displaying the screen, graphics and multimedia or links to graphics, and other links to other data associated with the screen wherein the screen database is located on a server separate from the attendant computer and the self-service computer, wherein displaying further includes displaying a message area on the screen of the attendant computer, the message area displays messages indicative of a status of the self-service computer, the status including an amount of time that the user has been operating the self-service computer during the transaction;
    recording attendant selections on the screen by an input device of the attendant computer, the attendant selections including selections made by the attendant on behalf of the user of the self-service computer during the transaction;
    sending the selections to the self-service computer by the attendant computer for substantially simultaneous display by the self-service computer and making the attendant selections immediately visible to the user at the self-service computer when made by the attendant;
    synchronizing the screen between the attendant computer and the self-service computer during the transaction; and
    accessing, by the attendant computer, information stored on the self-service computer during the transaction with access rights that are different from attendant computer access rights for accessing the information on the self-service computer during the transaction.

15. The method of claim 14, further comprising:
    storing a copy of the screen displayed by the self-service computer by the attendant computer prior to the determining step.

16. The method of claim 15, wherein the determining step comprises:
    determining changes in self-service computer configuration data by the attendant computer, including determining an identifier for identifying the screen displayed by the self-service computer; and
    determining the screen using the identifier by the attendant computer.

17. The method of claim 14, further comprising:
    determining changes in self-service computer configuration data by the attendant computer, including determining selections made by the user of the self-service computer;
    obtaining the selections made by the user of the self-service computer by the attendant computer; and
    substantially simultaneously displaying the selections made by the user of the self-service computer on the screen by the attendant computer.

18. The method of claim 14, further comprising:
    processing the transaction as a cash transaction by the attendant computer.

* * * * *